July 23, 1963  E. M. STRYKER, JR  3,099,009
AUTOMATIC DIRECTION FINDER SYSTEM
Filed Feb. 5, 1960  2 Sheets-Sheet 2

INVENTOR.
EDWIN M. STRYKER, JR.
BY *Moody and Harris*
ATTORNEYS

United States Patent Office 3,099,009
Patented July 23, 1963

3,099,009
AUTOMATIC DIRECTION FINDER SYSTEM
Edwin M. Stryker, Jr., Marion, Iowa, assignor to Collins Radio Company, Cedar Rapids, Iowa, a corporation of Iowa
Filed Feb. 5, 1960, Ser. No. 6,949
6 Claims. (Cl. 343—119)

This invention relates to a direction finding system, and more particularly to an improved and compact direction finding system which requires neither a rotatable direction sensing antenna nor insertion means for combining the signals from a plurality of antennas prior to coupling the resulting signal into the receiving means of said direction finding system.

A direction finding system of the type contemplated by this invention, that is, of the type which includes receiver means rather than transmitter means, has heretofore customarily required a loop-type antenna to determine the direction of the origin of a received radio signal. To accomplish this end, such an antenna must be rotatable so that it can be turned either until the plane of the loop is parallel to the incoming signal so that maximum voltage is coupled from the loop or, as is usually done, until the plane of the loop is perpendicular to the direction of the incoming signal so that minimum voltage is coupled therefrom.

In addition, the loop antenna, if used as a single antenna, also has the further disadvantage of being tunable to two null positions where minimum voltage is coupled from the loop. While this possible 180° ambiguity can be eliminated through the use of a second antenna, it has been necessary heretofore to combine the inputs from the two antennas prior to coupling the signal to the receiving means of the direction finding system.

It is therefore an objective of this invention to provide an improved direction finding system which is simple and compact but yet effective and reliable in ferreting out the direction of the origin of an incoming signal.

It is a further object of this invention to provide a direction finding system which eliminates the need for a rotatable antenna.

More particularly, it is an object of this invention to provide a direction sensing antenna having a plurality of windings which need not be rotated in order to ferret out the direction of the origin of an incoming signal.

It is also an object of this invention to provide a direction finding system which assures against a possible 180° ambiguity and yet requires no insertion means for combining the signals from a plurality of antennas prior to coupling the resulting signal into the receiving means of the system.

More particularly, it is an object of this invention to provide means whereby an incoming signal induces a plurality of voltages one of which is applied to a rotor assembly and the remainder of which are individually applied to a stator assembly so that said rotor assembly assumes a position dependent upon the direction of an incoming signal and never the reciprocal thereof.

This invention therefore provides an improved direction finding system having a non-rotatable direction sensing antenna with a plurality of diverging windings which have voltages induced therein determined by the direction of an incoming signal. Said voltages are applied to a stator assembly having corresponding windings to thereby cause a rotor assembly having a single winding, energized by voltages induced from a nondirectional antenna, to assume a position with respect to the adjacent stator assembly which is determined by the direction of the incoming signal.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention may be included as come within the scope of the claims.

The accompanying drawings illustrate one operative embodiment of the invention constructed according to the best mode so far devised for the practical application of the principles thereof, and in which.

Figure 1:
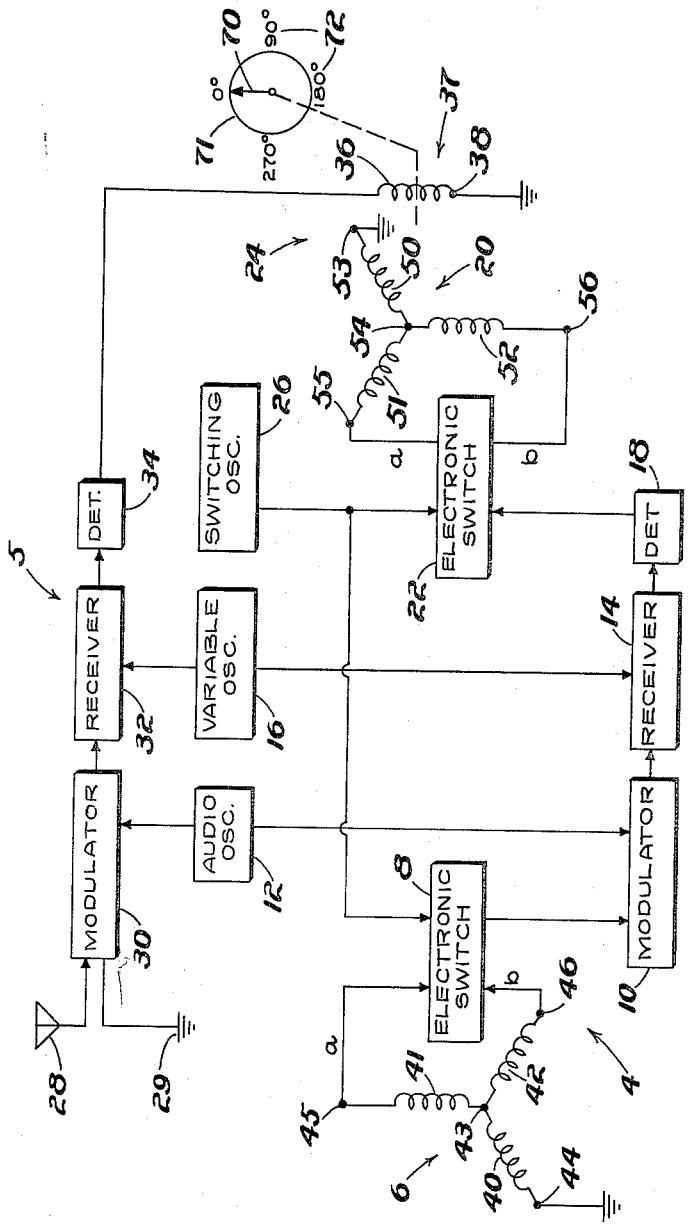
FIGURE 1 is a combination block diagram and schematic illustrating the direction finding system of this invention.

Referring now to the drawings in which like numerals have been used to indicate like characters throughout, the numeral 4 indicates generally the directional signal sensing portion of the direction finding system of this invention, while the numeral 5 indicates generally the non-directional signal sensing portion of the direction finding system of this invention.

In general, an incoming electromagnetic radio wave received by the non-rotatable direction sensing antenna 6 of this invention will induce a plurality of voltages therein as to be brought out more fully hereinafter.

As shown in FIGURE 1, voltages so induced may be alternately coupled through electronic switch 8 to modulator 10, which may be of a conventional type having a second input provided by audio oscillator 12. The output from modulator 10 may then be coupled to a conventional receiver 14, where it may be amplified and mixed with a second input to receiver 14 provided by oscillator 16, which oscillator is preferably variable to enable selection of specific incoming signals of different frequencies. The output from receiver 14 may then be coupled to a conventional detector 18, after which the resulting signal may be coupled to stator assembly 20 through electronic switch 22. If desired stator assembly 20 may be the stator of a conventional synchro receiver 24.

Electronic switches 8 and 22, which operate simultaneously, may be of a conventional type, and each may have its amplifying channels (not shown) alternately biased to cut-off by switching oscillator 26.

It is to be appreciated, of course, that a separate modulator, receiver and detector (not shown) could be utilized for each input from antenna 6 to eliminate the time sharing arrangement provided by electronic switches 8 and 22. It is also to be appreciated that the output voltages from antenna 6 could be coupled directly to receiver 14, if desired.

The incoming radio wave is also received by non-directional antenna 28 which may comprise a single whip-like rod which is preferably grounded at one end 29. This signal may be coupled, as by means of a transformer (not shown), to a conventional modulator 30 having a second input provided by oscillator 12. The output from modulator 30 may then be coupled to receiver 32 which may be of a conventional type and which has variable oscillator 16 connected thereto to assure that an incoming signal of the same frequency from both antennas will be selected. The output from receiver 32 may then be coupled to a conventional detector 34 after which the resulting signal is then coupled to rotatable winding 36 of rotor assembly 37, which assembly is mounted for rotation in a position adjacent to stator assembly 20 by any conventional means (not shown). One end 38 of rotor winding 36 is, of course, grounded to provide a signal return path. If desired, rotor assembly 37 may be the rotor of a conventional synchro receiver 24.

As shown in FIGURE 1, non-rotatable antenna element 6 preferably comprises three identical windings, or coils, 40, 41 and 42, which are joined together at one end at point 43 to form a Y. Winding 40 is grounded at its other end 44, while windings 41 and 42 have their free ends 45 and 46, respectively, alternately connected to modulator 10 through electronic switch 8. The axes of the windings of antenna 6 diverge so that the windings induce different voltages due to an incoming signal in order to sense the direction of said incoming signal. Since the incoming signal is usually vertically polarized, it is necessary, of course, for the axes of windings 6 to have nonparallel horizontal components, and it is preferable that said axes lie in a substantially horizontal plane. While antenna 6 is shown and described herein as comprising three windings, it is, of coure, to be appreciated that any plural number of windings could be used. The windings of antenna 6 may be physically mounted in a fixed position in any conventional manner.

It is essential that stator assembly 20 comprise identical windings that correspond in number and disposition (with repect to one another) to the windings of antenna 6. As shown in FIGURE 1, stator assembly 20 may comprise three identical windings or coils 50, 51 and 52 which have their axes lying substantially in the same plane and diverging at an angle of 120° to match the disposition of the axes of the windings of antenna 6. Like the windings of antenna 6, one end 53 of coil 50 is grounded while the other end is connected to one end of coils 51 and 52 at point 54. The free ends 55 and 56 of coils 51 and 52, respectively, are alternately connected to the output of detector 18 through electronic switch 22. The stator windings may be physically mounted in a fixed position, determined by the foregoing, in any conventional manner.

Thus, in operation, two separate parallel current paths are provided in antenna 6 and stator assembly 20. Path $a$ includes coils 40, 41, 50 and 51, and may be traced from ground through coil 40, coil 41, switch 8, modulator 10, receiver 14, detector 18, switch 22, coil 51, and coil 50 back to ground, while path $b$ includes coils 40, 42, 50 and 52, and may be traced from ground through coil 40, coil 42, switch 8, modulator 10, receiver 14, detector 18, switch 22, coil 52 and coil 50 back to ground. It is therefore evident that windings 50 and 51 of stator assembly 20 are energized because of induced voltage from antenna windings 40 and 41 during the period when current flows in path $a$, while windings 50 and 52 of stator assembly 20 are energized because of induced voltage from antenna windings 40 and 42 during the period when current flows in path $b$.

Figure 2:
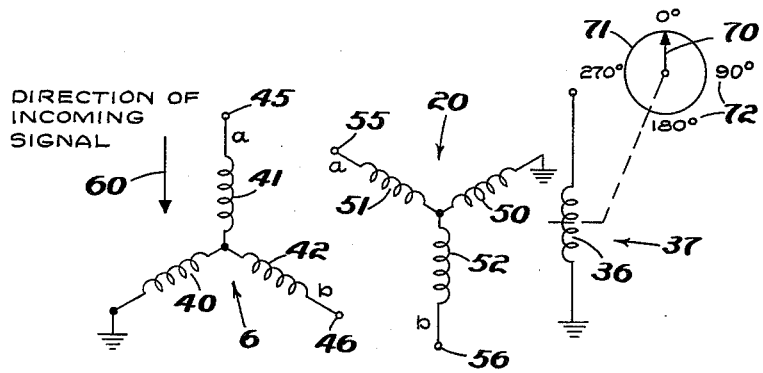
FIGURE 2 illustrates a position which the rotor assembly may assume due to induced voltages from an incoming signal from one specified direction.
Figure 3:
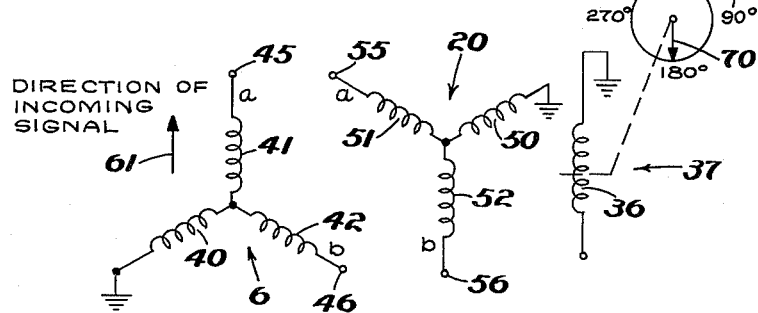
FIGURE 3 illustrates the position which the rotor assembly, as shown in FIGURE 2, would assume due to an incoming signal from a second specified direction.
Figure 4:
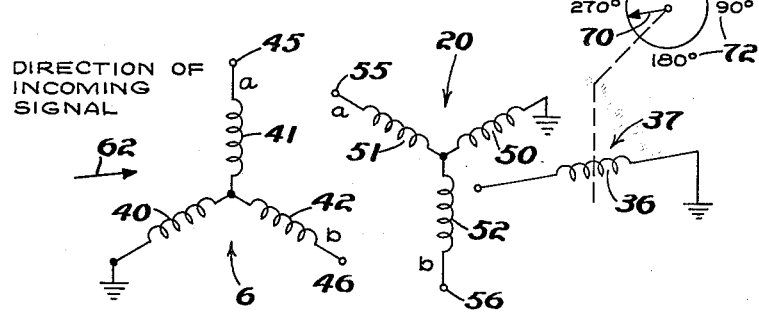
FIGURE 4 illustrates the position which the rotor assembly, as shown in FIGURE 2, would assume due to an incoming signal from a third specified direction.

FIGURES 2 through 4 of the drawings illustrate the positions which rotor assembly 37 may assume with repect to adjacent stator assembly 20 due to an incoming signal from three specified directions. It is to be appreciated, of course, that if, for example, the windings are reversed then the rotor would align itself in the opposite direction of that shown.

Referring to FIGURE 2, it can be seen that if an incoming selected signal is coming from a direction as shown by arrow 60, that is, parallel to the axis of winding 41, minimum voltage will be induced in coil 41 while a greater voltage, but less than maximum, will be induced in coils 40 and 42. The voltages induced in coils 40 and 41 will therefore be applied to coils 50 and 51 of stator assembly 20 when current flows in path $a$. Since coils 40 and 42 are disposed at the same angle with respect to the incoming radio wave, they will induce equal voltage. However, the polarity of each coil at any instant is obviously such as to cancel the other since the coils are identical and thus no current will flow in path $b$. Coils 50 and 52 are therefore not energized during the period when electronic switches 8 and 22 block current path $a$. As a result, since coils 50 and 51 will be substantially equally energized, rotor assembly coil 36 will align itself approximately equidistant from coils 50 and 51 as shown in FIGURE 2, in order to neutralize the magnetic forces acting on said rotor coil.

The direction of the axis of rotor coil 36 is determined by its instantaneous polarity with respect to the instantaneous polarity of the windings of stator assembly 20, since the rotor coil will always attempt to align itself so as to cancel the magnetic fields of the stator windings. This is illustrated best by FIGURE 3 where the direction of the incoming signal is shown by arrow 61 to be exactly opposite to that shown in FIGURE 2. Here it can be readily seen that the polarity of the voltages induced in coils 40 and 41 at any given instant will be the opposite of that induced by an incoming signal as shown in FIGURE 2 since the radio waves strike the stator winding from opposite directions. Obviouly the result of this will be a reversal of the instantaneous polarity of stator coils 50 and 51 which will cause rotor coil 36 to turn 180° from its position as shown in FIGURE 2.

As shown in FIGURE 4, if the incoming radio wave is coming from an angle of 260° with respect to that shown in FIGURE 2, or, in other word, at an angle of 100° with respect to the axis of winding 41, as shown by arrow 62, the voltage induced in stator winding 41 will be somewhat greater than that induced in either coil 40 or 42. Since the current flow from each coil will be in the same direction at any given instant and therefore additive, the signal applied to coils 50 and 51 when current flows in path $a$ will be proportionately greater than that applied to coils 50 and 52 when current flows in path $b$. Obviously, during that period of time when path $a$ is conductive, rotor coil 36 will be urged toward a position equidistant between coils 50 and 51, and while path $b$ is conductive, rotor coil 36 will be urged toward a position equidistant between coils 50 and 52. However, since the rate of switching between paths $a$ and $b$ is very rapid, and may be on the order of 1000 switching cycles per second, rotor coil 36 will position itself between these magnetic fields depending upon the relative strengths of each. As shown in FIGURE 4, therefore, rotor coil 36 will assume a position nearer the position which it would occupy if only current path $b$ were operative, since its coils will provide the weaker magnetic forces.

From the foregoing, it will be readily appreciated that rotor coil 36 will always assume a definite position with respect to stator assembly 20 governed by the direction of the incoming signal. To display the direction of the origin of this incoming signal, it is therefore only necessary to connect rotatable means, such as pointer 70, with rotor assembly 37 so that the two are constrained to rotate in unison. Such a pointer may be the rotatable component of an indicator 71 which may have direction identifying indicia 72 on the face thereof.

In view of the foregoing it should be readily apparent to those skilled in the art that this invention provides a simple and compact, yet effective and reliable means for ferreting out and automatically indicating the direction of the origin of a received radio signal.

What is claimed as my invention is:

1. A direction finding receiving system, comprising: a non-directional antenna element; first receiving means connected to said non-directional antenna element; a non-rotatable direction sensing antenna element having a plurality of windings, the axes of which have non-parallel horizontal components; second receiving means providing a plurality of current paths connected to the windings of said non-rotatable antenna element; variable tuning means connected with said first and second receiving means for selecting an incoming signal of the same frequency from both said antennas; a rotor assembly connected with said non-directional antenna element through said first receiving means; a stator assembly adjacent to said rotor assembly and having a plurality of windings corresponding in number and angular disposition to the windings of said non-rotatable antenna element; said stator windings being connected to the windings of said non-rotatable antenna element through the paths of said second receiving means to thereby cause said rotor assembly to assume a position with respect to said stator assembly determined by the direction of said selected incoming signal coupled to the stator assembly from said direction sensing antenna element; and display means connected with said rotor assembly to automatically indicate the direction of the origin of said selected signal.

2. The direction finding receiving system of claim 1, further characterized by the fact that the axes of the windings of said direction sensing antenna lie substantially in a horizontal plane.

3. A direction finding receiving system, comprising: a non-directional antenna element; a non-rotatable direction sensing antenna element comprising three windings, the axes of which lie substantially in a horizontal plane and diverge from a common junction at an angle of 120°; first receiving means connected with said non-directional antenna element; second receiving means; tuning means connected with said receiving means to assure selection of an incoming signal of the same frequency from both said antennas; means connecting said second receiving means with the free ends of two windings of said direction sensing antenna element, said means precluding electrical connection of said two free ends; a synchro receiver comprising a stator element, having three windings joined at one end and corresponding in relative disposition to the windings of said direction sensing antenna, and a rotor element, adjacent to said stator element and having a single winding one end of which is connected with said non-directional antenna through said first receiving means and the other end of which is connected with ground; means connecting the free ends of two of said stator windings to said second receiving means, said means precluding electrical connection between said free ends of said stator windings; means connecting the remaining free end of said non-rotatable antenna element windings and the remaining free end of said stator windings; and means connected with said rotor assembly to automatically indicate the direction of the origin of an incoming selected signal.

4. A direction finding receiving system, comprising: a non-rotatable direction sensing antenna element having a plurality of windings, the axes of which have non-parallel horizontal components; first receiving means connected with said antenna element; a stator assembly having a plurality of windings corresponding in number and disposition to the windings of said non-rotatable antenna element, said stator windings being connected with the windings of said non-rotatable antenna element through said first receiving means; a non-directional antenna element; second receiving means connected with said non-directional antenna element; tuning means connected with said first and second receiving means to assure selection of an incoming signal of the same frequency from both said antennas; a rotor assembly adjacent to said both said antennas; a rotor assembly adjacent to said stator assembly and having a rotatable winding connected with said non-directional antenna element through said second receiving means whereby said rotor assembly assumes a position with respect to said stator assembly determined by the direction of said selected incoming signal coupled to the stator assembly from said direction sensing antenna element, the energization of said rotor winding assuring that said rotor assembly will never assume a reciprocal position in response to said selected signal; and display means connected with said rotor assembly to automatically indicate the direction of the origin of said selected signal.

5. A direction finding receiving system, comprising: a non-directional antenna element; a non-rotatable direction sensing antenna element; a rotor assembly; a stator assembly adjacent to said rotor assembly; first means providing a first path connecting said non-directional antenna element to said rotor assembly; second means providing additional path means connecting said direction sensing antenna element to said stator assembly, said additional path means being isolated electrically from said first path; said first and second means including tuning means for selecting an incoming signal of the same frequency from both said antenna elements; the voltage coupled to said stator assembly through said second means and the voltage coupled to said rotor assembly through said first means causing said rotor assembly to assume a position with respect to said stator assembly determined by the direction of said incoming signal; and display means connected with said rotor assembly to indicate automatically the direction of the origin of said incoming selected signal.

6. A direction finding receiving system, comprising: a non-directional antenna element; a first modulator connected with said non-directional antenna element; a non-rotatable direction sensing antenna element having a plurality of windings, one said winding having one end connected to one end of the other said windings; a second modulator connected with said direction sensing antenna element; oscillating means for providing a second input signal of the same frequency to each said modulator; first receiving means connected to receive the output from said first modulator; second receiving means connected with said second modulator to receive the output therefrom; tuning means connected with said first and second receiving means for selecting a signal of the same frequency from both said modulators; a stator assembly comprising a plurality of coils, one of said coils having one end connected with one end of the other stator coils and its other end connected with the other end of said one winding of said direction sensing antenna element, and said other stator coils having said other ends connected with said second receiving means, said coils corresponding in number and disposition to the windings of said direction sensing antenna; means for switching between first and second positions whereby said stator windings are selectively energized by selected windings of said direction sensing antenna through said second modulator and said second receiving means; a rotor assembly connected to said first receiving means for receiving the output therefrom and positioned adjacent to said stator assembly and responsive to voltages coupled to said stator coils to thereby cause said rotor assembly to assume a position with respect to said stator assembly determined by the direction of said incoming selected signal; and display means connected with said rotor assembly to indicate automatically the direction of the origin of said incoming selected signal.

References Cited in the file of this patent

UNITED STATES PATENTS 2,213,273    Earp  ---------------- Sept. 3, 1940